Feb. 11, 1936.  J. C. G. MAXWELL  2,030,218
FLEXIBLE HOSE SUPPORT
Filed Aug. 11, 1934  2 Sheets-Sheet 1

INVENTOR
James C. G. Maxwell
BY Wooster & Davis
ATTORNEYS

Feb. 11, 1936.  J. C. G. MAXWELL  2,030,218
FLEXIBLE HOSE SUPPORT
Filed Aug. 11, 1934  2 Sheets-Sheet 2
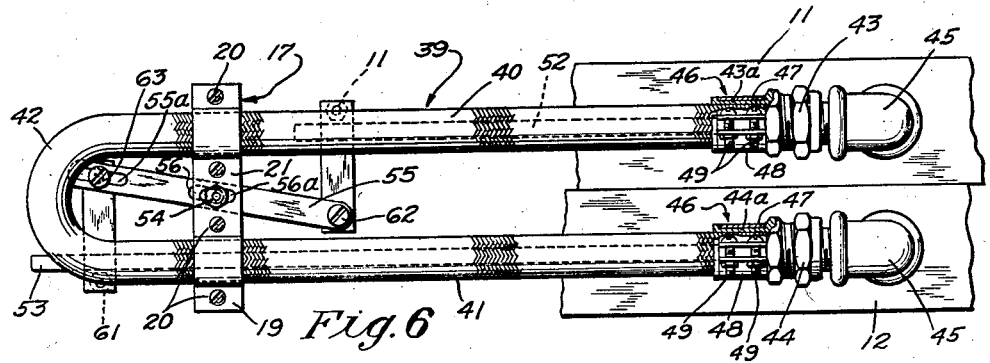
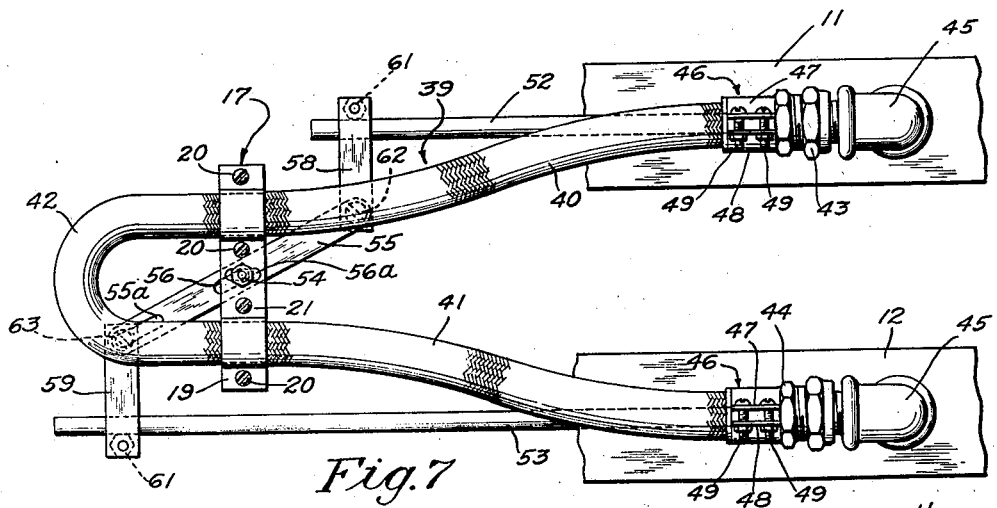
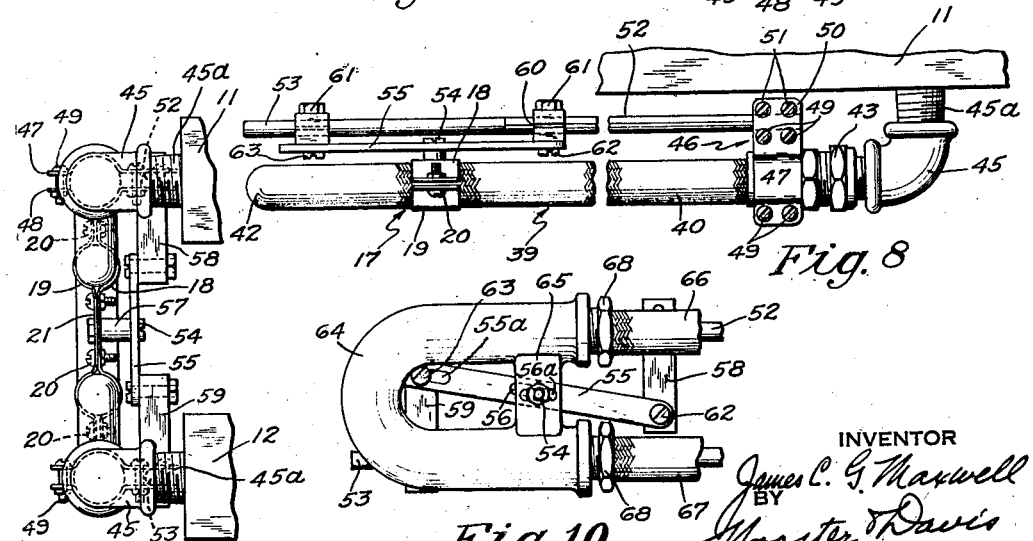
INVENTOR
James C. G. Maxwell
BY Wooster Davis
ATTORNEYS Patented Feb. 11, 1936

2,030,218

UNITED STATES PATENT OFFICE

2,030,218

FLEXIBLE HOSE SUPPORT

James C. G. Maxwell, Waterbury, Conn., assignor to The American Brass Company, Waterbury, Conn., a corporation of Connecticut Application August 11, 1934, Serial No. 739,411

3 Claims. (Cl. 138—61)

This invention relates to new and useful improvements in flexible hose supports and has for an object to provide a means for supporting a flexible hose, such as is used to connect a pair of platens in a press for molding articles of plastic materials for the steam supply to them in a manner to have the hose self draining and thereby prevent the formation of water pockets in the hose.

Another object is to provide a means for the purpose stated and which will have long life and will cause a distribution of the flexing, in a hose used for the purpose suggested, and will cause the hose to flex in a single plane thereby preventing twisting of the hose and increasing the period of its useful life.

Other objects and advantages will become apparent from a consideration of the following detailed description taken in connection with the accompanying drawings wherein satisfactory embodiments of the invention are shown. However, it is to be understood that the invention is not limited to the details disclosed, but includes all such variations and modifications as fall within the spirit of the invention and the scope of the appended claims.

In the drawings:

Fig. 6 is a view similar to Fig. 1 but showing a modified construction of support for the U-shaped connecting means or tube;

Fig. 7 is a side elevational view showing the device of Fig. 6 with the press platens open;

Fig. 8 is a top plan view of the device as shown in Fig. 7;

Fig. 9 is an end view looking from the right in Fig. 7; and

Fig. 10 is a side elevational view showing a modified construction of tube or connecting means with the support of Fig. 6.

Figure 1:
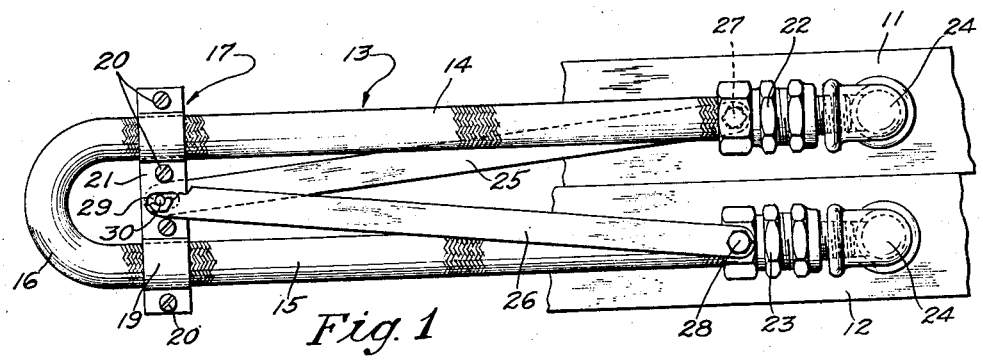
Fig. 1 is a side elevational view of the means of the present invention attached to the closed platens of a press.

In platent press constructions for the moulding of articles of bakelite or other mouldable material either one or both of the platens of the press are movable so that the press may be opened for loading and unloading. For heating purposes the upper and lower platens of the press are usually connected by flexible hose for the supply and circulation of heating media, as steam, the flexible hose permitting of relative movements of the platens during opening and closing of the press. The steam is usually supplied to one platen by a suitable supply pipe, not shown, and after circulating through it passes through the connecting hose to the other platen. Where the hose is simply looped to permit of movement of the platens and is not supported except where connected with the platens, portions of the hose drop lower than the connections between the hose and platens thereby forming water pockets or traps which interfere with proper circulation or supply of steam. The present invention provides means to support the hose against the formation of these water pockets and which means will permit of the required movement of the platens to which the hose is coupled.

Referring in detail to the drawings and at first particularly to Figs. 1 through 4 at 11 and 12 are shown the upper and lower relatively movable platens of a press (not shown) and either or both of these platens may be movable. A U-shaped means or tube 13 connects the platens 11 and 12 and in Figs. 1 through 4 this tube 13 comprises a single piece or length of flexible hose bent upon itself into substantially U-form whereby it comprises upper and lower arms 14 and 15 and a U-shaped connecting or bight portion 16. The hose may be of any suitable construction, such as a flexible metal portion covered with a braided wire covering 13a or a rubber hose so covered or any other suitable flexible hose or tubing. The hose is held in the U-shape by means of a clamp 17 comprising a pair of plates 18 and 19 disposed against opposite sides of the hose and embracing the upper and lower arms thereof at or adjacent the portion 16 thereof. The plates 18 and 19 are secured together and against the hose as by bolts 20 and the portions of the plates between the arms 14 and 15 of the hose are drawn together and constitute a web 21. The clamp 17 constructed as described will serve to hold the hose in the U-shape.

A coupling 22 is secured to the free end of the upper arm of the means or tube 13 and a similar coupling 23 is secured to the free end of the lower arm of said means or tube, the said couplings forming the free ends of the arms. Any suitable means as the elbow fittings 24 and nipples 24a may be used to connect the couplings with the respective platens 11 and 12. A pair of similar flat bars 25 and 26 are arranged at the opposite sides of the tube 13 and the forward end of the bar 25 is pivotally secured to the free end portion of the arm 14 as to the coupling 22 by a pivot 27 and a similar pivot 28 connects the forward end of the bar 26 with the coupling 23 of the free end portion of arm 15. It will thus be seen that the pivots 27 and 28 are connected with the platens to move therewith. In its web portion 21 the clamp 17 is provided with a slot 29 extending transversely of said web portion or in the direction of the length of the arms 14 and 15 of the tube 13.

The rear ends of the bars 25 and 26 are preferably, although not necessarily, disposed at opposite sides of said web portion 21 and a bolt 30 passes through such ends of the arms and through the slot 29 in the web portion of the clamp. Collars or spacers 31 are disposed about the bolt 30 at opposite sides of the web portion of the clamp 17 whereby the bars 25 and 26 are held against play or movement in the direction of the length of the bolt and are held in parallel relation. It will be understood that the bolt 30 serves to pivotally connect together the rear end portions of the arms 25 and 26 and further serves to connect them with the clamp 17 but for a limited movement relative to said clamp in the direction of the length of the slot 29.

With the means described when the platens are closed as in Fig. 1 the tube or means 13 is supported as shown in that figure and all parts of said means are above the lower coupling 23 and below the upper coupling 22 so that the said means is self-draining. When the upper platen moves up or the lower platen moves down, as in Fig. 2, the couplings 22 and 23 move in straight vertical lines with the platens and the upward movement of the coupling 22 will draw the bar 25 upwardly and inwardly or forwardly so that the pivot bolt 30 slides in the slot 29 and pulls the clamp 17 and the outer end portion of the bar 26 upwardly supporting the entire tube as shown in Fig. 2 with all parts of said tube above the lower coupling 23 and none of it ever goes above the upper coupling 22 whereby all parts of the tube may drain and the upper platen will be drained. From this it will be clear that at all times the tube or means 13 is so supported as to be self-draining and this is true when the platens are opened and when they are closed.

Figures 4, 5:
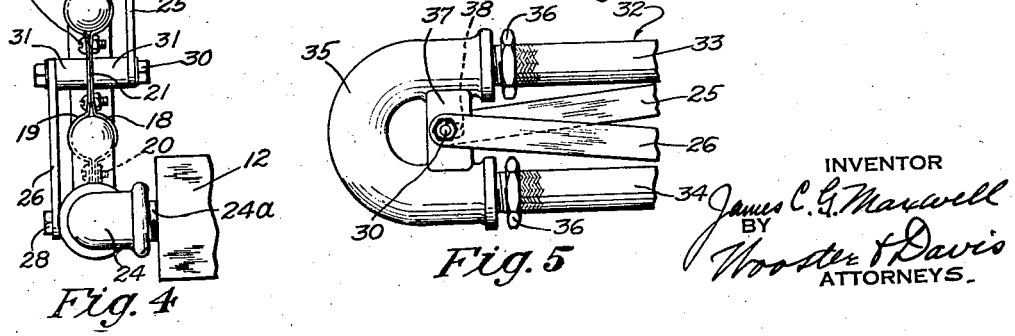
Fig. 4 is an end view looking from the right in Fig. 2.
Fig. 5 is a side elevational view showing a slightly different form of connecting tube which may be employed.

Fig. 5 suggests a slight modification and in this case the U-shaped means or tube corresponding with 13 of Figs. 1 through 4 is generally designated 32 and comprises an upper arm 33 and a lower arm 34 each formed of a length of flexible hose or tubing. Said arms are connected by a U-shaped or bight portion 35 shown as comprising a casting to which the arms 33 and 34 are connected as by couplings 36 at the outer ends of said arms. The U-shaped portion 35 of the tube 32 is formed with a web 37 having a slot 38 therein corresponding with the slot 29 of the clamp 17, and through which is passed the pivot bolt 30 pivotally connecting the rear ends of the bars 25 and 26 and also connecting said bars to the web for pivotal movement relative thereto and for a movement relative thereto in the direction of the length of the slot 38. The operation with the construction of Fig. 5 will be exactly the same as that with the construction of Figs. 1 through 4 and all parts of the U-shaped means or tubing 32 will be maintained above the coupling at the free end of its lower arm so that said means or tubing will always be self-draining.

The form comprising the continuous one piece tubing of Figs. 1 to 4 is preferred as it is simpler, requires less parts and does away with the couplings or connections 36.

Referring now to Figs. 6 through 9 a U-shaped means or tube is generally designated 39 and serves to connect the upper and lower platens 11 and 12 and as shown is formed by bending up a single piece of hose upon itself. Means 39 includes upper and lower arms 40 and 41 and a U-shaped or bight portion 42. To the free ends of the upper and lower arms 40 and 41 there are secured similar couplings 43 and 44 forming portions of said arms and which through elbow fittings 45 and nipples 45a are connected with the respective platens 11 and 12. One of the clamps 17 is applied to the arms 40 and 41 adjacent the bight portion 42 of the means or tube 39 and such clamp serves to retain the piece of hose in the desired U-shape.

Secured to an extension 43a of the coupling 43 is a clamp 46 comprising upper and lower plates 47 and 48 drawn together by screws or bolts 49. At one side of the arm 40 the clamp 47 includes extensions 50 through which are passed an additional pair of bolts 51 and between said pair of bolts and a pair of the bolts 49 is clamped one end portion of a bar 52 which bar extends along in the direction of the length of the arm 40 and is movable with the coupling 43 thereof. One of the clamps 46 is secured to an extension 44a of the coupling 44 so as to move therewith and a bar 53 has its forward end secured in said clamp in the manner described in connection with the securing of the inner end of the bar 52. It will therefore be seen that the couplings 43 and 44 together with the rods 52 and 53 are connected to the platens to move therewith in straight lines.

A stud 54 is carried by the web portion 21 of the clamp 17 and mounted on the outer end of said stud is a link 55 which link has a slot 56 through its intermediate portion and through which said stud passes. It is also preferred that a transverse slot 56a be in the web portion 21 of clamp 17 to receive stud 54, the same as in Figs. 1 to 4. A collar or spacer means 57 surrounds the stud or pivot bolt 54 between the link 55 and the web portion 21 of the clamp. Rigidly secured to the outer end portion of the bar 52 is a downwardly projecting extension 58 and a similar but upwardly projecting extension 59 is secured to the outer end portion of the bar 53. These extensions as here disclosed are each provided with an opening through which the bars may be passed and each extension has a slot 60 from an end thereof inwardly to said opening and the extensions are clamped on the bars by tightening bolts 61 passing through the slotted portions of the extensions.

A bolt 62 pivotally connects the lower end of the extension 58 with the forward end of the link 55 and a similar bolt 63 pivotally connects the upper end of the extension 59 with the rear end portion of said link and through the link and stud the rear ends of the bars are connected with the web 21 for movement relative thereto. The pivot bolt 63 passes through a longitudinal slot 55a in the link 55, although this slot may be in the opposite end of this link to receive pivot bolt 62 if desired. It has been found that with this arrangement for the most satisfactory action with greatest movement of the platens there should be a longitudinal slot 56 at the center of link 55 as well as a transverse slot 56a in web 17 for the pivot 54, and in addition there should be a longitudinal slot 55a in link 55 for one of the pivots 62 or 63 but this latter slot may be provided for either pivot. With this construction when the platens are closed as in Fig. 6 the tube or means 39 is so supported that all its parts are above the coupling 44 and below coupling 43 and will drain and water pockets will not be formed. When the platens are opened or moved away from each other either or both of the couplings 43 and 44 are moved vertically and as the upper platen moves upwardly coupling 43 and bar 52 are carried upwardly. This draws the extension 58 upwardly and causes the link 55 to rock about the stud 54 and results in the bend or U-portion 42 of the tube or means 39 being carried upwardly, because as the link 55 pivots about pivot 63 it raises the pivot 54 and therefore lifts the clamp 17 and with it the free end or looped portion 42 of the flexible hose. This insures the flexing of the hose is distributed substantially equally to the two arm portions 40 and 41 and also that the curve or end portion 42 is always above the lower coupling 44 and never goes above coupling 43 so that no water pockets are formed either in the upper platen or the connecting hose and they drain freely.

Fig. 7 shows the parts when the platens are open and it will be noted that the tube 39 has been so elevated that both of its arms are well above the coupling 44 so that the tube will be self draining and there will be no chance of a water pocket forming. From Figs. 6 and 7 it will be clear that the bar 52 and its extension 58 support one end of the link 55 and that the bar 53 and its extension 59 support the other end of the link. Thus the latter is prevented from rocking freely about stud 54 and the link through said stud supports the means or tube 39. As the platen 11 moves upwardly the forward end of link 55 is drawn upwardly but since its rear end cannot move downwardly, owing to bar 53 and extension 59, its intermediate portion and the clamp 17 attached thereto, and the tube 39 held by the clamp, must move upwardly. While the bars 52 and 53 are shown at the platen side of the tube or means 13 and of different lengths this is a matter of convenience or choice.

Fig. 10 illustrates the use of a casting 64 as the bight or return portion of the U-shaped tube or means and said casting is U-shaped and includes a web 65 carrying the stud 54. In this case the upper and lower arms 66 and 67 of the tube are lengths of hose and are coupled with the casting as by connectors 68. The link 55 is pivoted on the stud carried by the web 65 and is pivoted at its respective ends to the extensions 58 and 59 of the bars 52 and 53 respectively. This construction will obviously function the same as the device of Figs. 6 and 9.

From the foregoing description taken in connection with the accompanying drawings it will be clear that the tube or tubular means, whether of a single piece of hose as in Figs. 1 and 6 or of two sections of hose and a U-shaped casting as in Figs. 5 and 10, will always be so supported as to be above its lower coupling and below its upper coupling so as to be self draining and prevent the formation of water pockets or traps. Further in the various forms of the invention the supporting means is connected with the couplings on the free ends of the arms of the tubes and so the supporting means form units with the tube. The supporting means disclosed will increase the life of the flexible sections or hose of the tube or means of the various forms disclosed, due to the fact that all of the flexing does not take place at any one point in the length of the single piece of hose of Figs. 1 and 6 or in the lengths of the separate sections of hose in Figs. 5 and 10. As is clearly indicated by Figs. 2 and 7 the flexing is distributed through the upper and lower arms of the tube, and it should also be clear that the tube is permitted to flex in only one plane, twisting of the tube being avoided.

Figure 2:
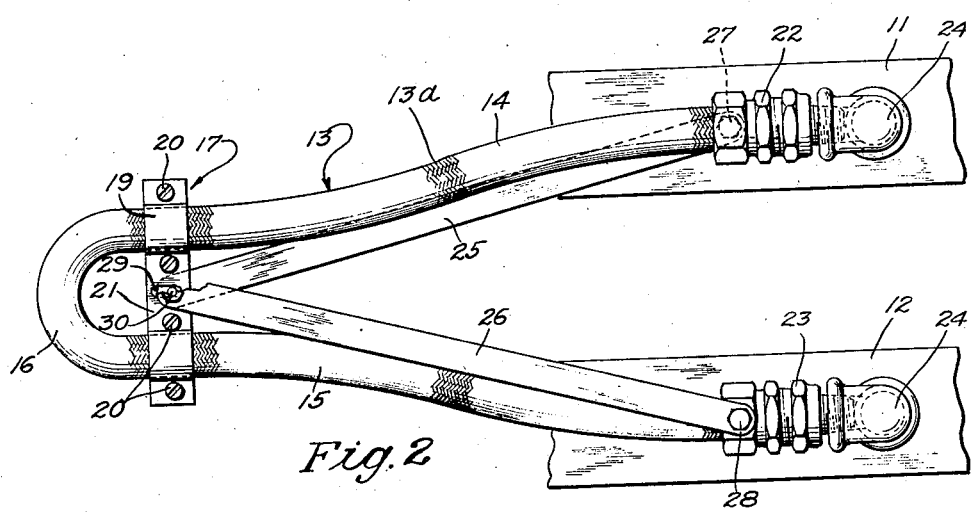
Fig. 2 is a similar view the platens being in open or separated position.
Figure 3:
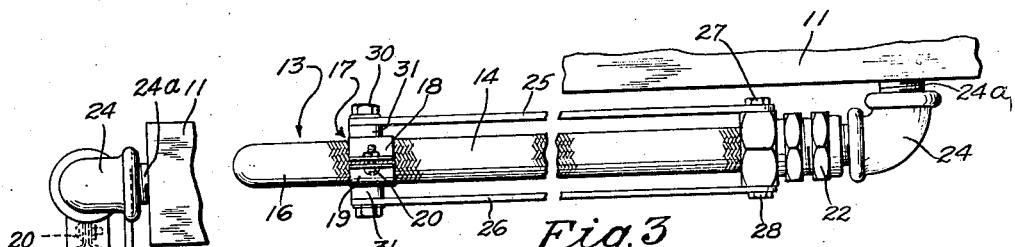
Fig. 3 is a top plan view of the device as shown in Fig. 2.

As above suggested, the U-shaped tube or means may comprise a single length or piece of hose as in Figs. 1 and 6 or it may comprise a pair of relatively short hose sections connected by a U-shaped casting as in Figs. 5 and 10. When but a single length of hose is used and is bent into the required shape, the number of couplings required is decreased with a consequent lessening of the cost of the unit. Where the single length of hose is used, the clamp 17 serves to maintain it in the required form and also the web portion 21 of the clamp provides a means for attaching or connecting the ends of the supporting bars to the bend or bight portion of the tube. Any of the various forms disclosed may have their positions reversed from that in which they are shown. That is, the devices of Figs. 1 and 6 might be reversed to have the bars 25 and 40 lowermost but the action of supporting the tube would be substantially that already described.

Having thus set forth the nature of my invention, what I claim is:

1. Means for supporting the bight portion of a substantially horizontally disposed flexible U-shaped tube having its ends connected to upper and lower relatively movable parts, comprising means bridging the U adjacent the bight, and a pair of arms pivotally secured to the bridging means and each to one of the relatively movable parts to support the bight portion against sagging below the connection to the lower part.

2. Means for supporting the bight portion of a substantially horizontally disposed flexible U-shaped tube having its ends connected to upper and lower relatively movable parts, comprising means bridging the U adjacent the bight, and a pair of arms pivotally connected with the bridging means by a connection which permits relative movement between the arms and the bridging means in a direction longitudinally of the legs of the U-shaped tube, and means connecting the arms each to one of the relatively movable parts to support the bight portion against sagging below the connection to the lower part.

3. Means for supporting the bight portion of a substantially horizontally disposed flexible U-shaped tube having its ends connected to upper and lower relatively movable parts, comprising means bridging the U adjacent the bight, a pair of arms secured one to each of the relatively movable parts, and means pivotally connecting said arms with the bridging means comprising a link pivotally connected at its respective ends to the arms and intermediate said connections pivotally connected to the bridging means to support the bight portion against sagging below the connection to the lower part.

JAMES C. G. MAXWELL.